United States Patent
Kurihara

(10) Patent No.: US 10,411,263 B2
(45) Date of Patent: Sep. 10, 2019

(54) ELECTRODE FOR SECONDARY BATTERY, AND SECONDARY BATTERY

(71) Applicant: TOPPAN PRINTING CO., LTD., Tokyo (JP)

(72) Inventor: Hitoshi Kurihara, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 162 days.

(21) Appl. No.: 15/082,383

(22) Filed: Mar. 28, 2016

(65) Prior Publication Data

US 2016/0211522 A1 Jul. 21, 2016

Related U.S. Application Data

(63) Continuation of application No. PCT/JP2014/075908, filed on Sep. 29, 2014.

(30) Foreign Application Priority Data

Sep. 30, 2013 (JP) .................... 2013-204568

(51) Int. Cl.
| | |
|---|---|
| *H01M 4/62* | (2006.01) |
| *H01M 4/36* | (2006.01) |
| *H01M 4/13* | (2010.01) |
| *H01M 4/48* | (2010.01) |
| *H01M 10/0525* | (2010.01) |

(Continued)

(52) U.S. Cl.
CPC ............... *H01M 4/62* (2013.01); *H01M 4/04* (2013.01); *H01M 4/0404* (2013.01); *H01M 4/13* (2013.01); *H01M 4/131* (2013.01); *H01M 4/134* (2013.01); *H01M 4/1391* (2013.01); *H01M 4/366* (2013.01); *H01M 4/386* (2013.01); *H01M 4/48* (2013.01); *H01M 4/485* (2013.01); *H01M 4/622* (2013.01); *H01M 10/0525* (2013.01); *H01M 2004/028* (2013.01); *H01M 2220/20* (2013.01)

(58) Field of Classification Search
None
See application file for complete search history.

(56) References Cited

U.S. PATENT DOCUMENTS

2012/0088155 A1* 4/2012 Yushin .................... H01M 2/16
429/217

FOREIGN PATENT DOCUMENTS

| JP | 11-354104 | 12/1999 |
|---|---|---|
| JP | 2002-324551 | 11/2002 |

(Continued)

OTHER PUBLICATIONS

Machine translation of JP 2005-293942 A (Year: 2005).*

(Continued)

*Primary Examiner* — Robert S Carrico

(57) ABSTRACT

An electrode for a secondary battery includes a current collector, and an active material layer being formed on a surface of the current collector, and containing an active material and a binder, in which the active material contains $SiO_x$, a surface of $SiO_x$ is modified with one or more groups selected from the group consisting of an aniline group, an imidazole group, and an amino group, and the binder is constituted by a water-soluble polymer having a sugar chain structure that contains a carboxylic acid group.

4 Claims, 3 Drawing Sheets

(51) Int. Cl.
*H01M 4/02* (2006.01)
*H01M 4/134* (2010.01)
*H01M 4/04* (2006.01)
*H01M 4/131* (2010.01)
*H01M 4/1391* (2010.01)
*H01M 4/485* (2010.01)
*H01M 4/38* (2006.01)

(56) References Cited

FOREIGN PATENT DOCUMENTS

| | | |
|---|---|---|
| JP | 2005-293942 | 10/2005 |
| JP | 2007-018874 A | 1/2007 |
| JP | 2011-11928 A | 1/2011 |
| JP | 2011-49046 | 3/2011 |
| JP | 2013-20909 | 1/2013 |
| JP | 2013-145669 | 7/2013 |
| JP | 2013-161832 | 8/2013 |
| WO | WO 2009/028530 A1 | 3/2009 |
| WO | WO 2011/140150 A1 | 11/2011 |
| WO | WO 2013/087780 A1 | 6/2013 |
| WO | WO 2014/189923 A1 | 11/2014 |

OTHER PUBLICATIONS

Machine translation of JP 2013-145669 A (Year: 2013).*
Machine translation of JP 2011-011928 A (Year: 2011).*
Extended European Search Report dated Feb. 13, 2017 in corresponding European Patent Application No. 14846841.6.
International Search Report dated Dec. 16, 2014, in corresponding International Application No. PCT/JP2014/075908.
Chinese Office Action dated Apr. 13, 2017 in corresponding Chinese Patent Application No. 201480053393.0.
Office Action dated Jul. 27, 2018 in corresponding Chinese Patent Application No. 201480053393.0, 11 pgs.
Office Action dated Oct. 9, 2018 in related Japanese Patent Application No. 2015-539429 (6 pages).
Office Action dated May 21, 2019 in Japanese Patent Application No. 2015-539429 (4 pages) (4 pages English Translation).

* cited by examiner

ELECTRODE FOR SECONDARY BATTERY, AND SECONDARY BATTERY

CROSS REFERENCE TO RELATED APPLICATIONS

This application is a continuation application based on a PCT Patent Application No. PCT/JP2014/075908, filed Sep. 29, 2014, whose priority is claimed on Japanese Patent Application No. 2013-204568, filed Sep. 30, 2013, the entire content of which are hereby incorporated by reference.

BACKGROUND OF THE INVENTION

Field of the Invention

The present invention relates to an electrode for a secondary battery, and a secondary battery using the same, and more particularly, to a cathode electrode for a nonaqueous electrolyte secondary battery capable of improving cycle characteristics.

Description of the Related Art

Recently, as a secondary battery capable of being repetitively charged and discharged, a lithium (Li) ion secondary battery has attracted attention for a reduction in the amount of petroleum used or a greenhouse effect gas, and additional diversification or optimization of energy infrastructures. Particularly, development of usage in an electric vehicle, a hybrid electric vehicle, and a fuel battery vehicle has been expected. In the electric vehicle, an improvement in travel distance is demanded, and an improvement in energy density of a secondary battery will be further demanded in the future.

As to a cathode electrode of the lithium ion secondary battery, a graphite electrode is typically used. A theoretical capacity of graphite is 372 mAhg (active material)$^{-1}$. In contrast, as an active material that exhibits a capacity greater than that of graphite, recently, silicon (Si) and tin (Sn) have attracted attention. A theoretical capacity of Si is 4200 mAhg (active material)$^{-1}$, and a theoretical capacity of Sn is 990 mAhg (active material)$^{-1}$. On the other hand, Si has a capacity that is approximately 11 times that of graphite, and thus a volume change in accordance with lithiation and delithiation of Li also increases. The volume increases approximately 4 times due to lithiation of Li.

In the electrode using the active material having a large capacity in comparison to graphite, due to a large volume change in accordance with charge and discharge, there are concerns such as a disconnection in a conduction path of the electrode, detachment from the electrode in accordance with pulverization, separation of a current collector and an active material layer, and the like. These may become a cause of deterioration of the cycle characteristics of a secondary battery.

In addition, as a main cause of deterioration of cycle characteristics, consumption of Li in accordance with formation of a solid electrolyte interface (SEI) (a film that is generated in a case of using ethylene carbonate, and inactivates and stabilizes a surface of an active material so as to insert lithium therethrough) can be exemplified. Particularly, in a case of using a Si-based active material, in which a large volume variation in accordance with charge and discharge occurs, as an electrode, consumption of Li in accordance with formation of SEI is also negligible when considering that breakage and generation of SEI may be repeated.

For example, Japanese Unexamined Patent Application, First Publication No. H11-354104 discloses an invention relating to formation of a stable SEI. Here, an electrode is processed with a silane coupling agent and the like so as to have LUMO of 1.0 eV or greater (LUMO; Lowest Unoccupied Molecular Orbital; a molecular orbital that is not occupied with electrons and has the lowest energy, the lowest unoccupied orbital). In Japanese Unexamined Patent Application, First Publication No. H11-354104, a stable SEI is formed, but there is a concern that an increase in electrode interfacial resistance is also caused, and thus a decrease in capacity may occur.

In addition, for example, Japanese Unexamined Patent Application, First Publication No. 2011-49046 describes that a binder and an active material are covalently bonded to each other as means for preventing the active material from being detached from an electrode. According to this, it is possible to suppress deterioration of the cycle characteristics. However, if the coupling is cut out once, the covalent coupling between the binder and the active material is not recovered. Accordingly, although it can be said that an improvement in characteristics is exhibited, an additional improvement in the cycle characteristics is demanded.

In addition, for example, PCT International Publication No. WO 2011/140150 describes that sodium alginate is used as the binder. The active material and the binder are bound to each other due to an electrostatic mutual operation, and coupling is maintained in a self-recovery manner. Accordingly, it is considered that the cycle characteristics can be improved.

However, in the inventions described in Japanese Unexamined Patent Application, First Publication No. H11-354104 to PCT International Publication No. WO 2011/140150, an effect of improving the cycle characteristics of the secondary battery is low, and thus an additional improvement in the cycle characteristics is demanded.

The invention has been made in consideration of the above-described problems, and an object thereof is to provide an electrode for a secondary battery capable of improving cycle characteristics, and a secondary battery.

SUMMARY

The present inventors have extensively studied to additionally improve the cycle characteristics of the secondary battery, and as a result, they found that when changing a polarity on a surface of an active material, binding properties due to an electrostatic mutual operation with a binder are improved, and thus the cycle characteristics are greatly improved.

An electrode for a secondary battery according to a first aspect of the invention, includes a current collector, an active material layer being formed on a surface of the current collector, and containing an active material and a binder, in which the active material contains $SiO_x$, a surface of $SiO_x$ is modified with one or more groups selected from the group consisting of an aniline group, an imidazole group, and an amino group, and the binder is constituted by a water-soluble polymer having a sugar chain structure that contains a carboxylic acid group.

In the first aspect, the active material may contain $SiO_x$ in which x is 1.5 or less.

In the first aspect, the binder may be an alginate.

In the first aspect, a surface of $SiO_x$ may be modified with the amino group.

In the first aspect, a modification amount of the amino group may be 0.1% by weight to 20% by weight with regard to the weight of the active material.

In the first aspect, a particle size (median size: D50) of $SiO_x$ may be 0.5 μm to 10 μm.

In the first aspect, a weight ratio of the binder in the active material layer may be 3% by weight to 20% by weight with regard to the weight of the active material.

A secondary battery according to a second aspect of the invention, includes the electrode for a secondary battery according to the first aspect.

According to the aspects of the invention, it is possible to provide an electrode for a secondary battery which is excellent in cycle characteristics, and a secondary battery that uses the electrode for a secondary battery and is excellent in cycle characteristics.

DETAILED DESCRIPTION OF THE PREFERRED EMBODIMENTS

Hereinafter, an electrode for a secondary battery, and a secondary battery according to an embodiment of the invention will be described with reference to the accompanying drawings.

In addition, this embodiment will be described in detail for easy understanding of the gist of the invention, but does not limit the invention unless otherwise stated. In addition, for convenience, the drawings used in the following description may illustrate main portions in an enlarged manner for easy understanding of characteristics of this embodiment, but actual dimensional ratios and the like of respective constituent elements are not limited thereto.

In this embodiment, a lithium ion secondary battery is illustrated as the secondary battery of the invention, and description will be given of an example in which the electrode for a secondary battery is applied to a cathode electrode of the lithium ion secondary battery.

Figure 1:
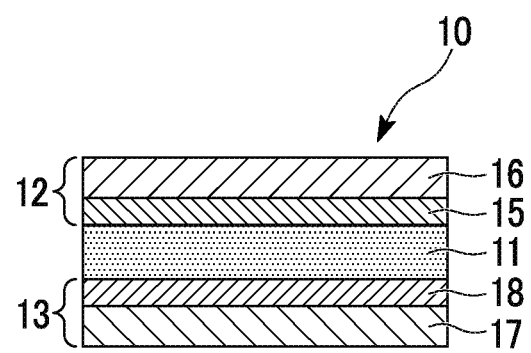
FIG. 1 is a cross-sectional view illustrating a secondary battery according to an embodiment of the invention.

FIG. 1 is a cross-sectional view illustrating a secondary battery including the electrode for a secondary battery of this embodiment.

A lithium ion secondary battery (secondary battery) 10 includes an electrolyte layer 11, and a positive electrode 12 and a cathode electrode (electrode for a secondary battery) 13 which are disposed on one surface (first surface) and the other surface (second surface) of the electrolyte layer 11, respectively.

A laminated body, which is constituted by the electrolyte layer 11, the positive electrode 12, and the cathode electrode 13, may be accommodated in an external packaging body (not illustrated) such as a metal.

The positive electrode 12 includes a current collector 15, and a positive electrode active material layer 16 that is formed on one surface (first surface) of the current collector 15. The current collector 15 may appropriately employ a material that is used in the related art as a positive electrode current collector material for a secondary battery. Examples thereof include aluminum, nickel, copper, iron, stainless steel (SUS), titanium, and the like. Aluminum is particularly preferable from the viewpoints of electron conductivity and battery operation potential. A typical thickness of the current collector 15 is approximately 10 μm to 30 μm.

A positive electrode active material, which constitutes the positive electrode active material layer 16, is not limited as long as the positive electrode active material is capable of lithiating and delithiating lithium. A positive electrode active material, which is typically used in the lithium ion secondary battery, can be appropriately employed. Specific examples thereof include a lithium-manganese composite oxide (such as $LiMn_2O_4$), a lithium-nickel composite oxide (such as $LiNiO_2$), a lithium-cobalt composite oxide (such as $LiCoO_2$), a lithium-iron composite oxide (such as $LiFeO_2$), a lithium-nickel-manganese composite oxide (such as $LiNi_{0.5}Mn_{0.5}O_2$), a lithium-nickel-cobalt composite oxide (such as $LiNi_{0.8}Co_{0.2}O_2$), a lithium-transition metal phosphate compound (such as $LiFePO_4$), and a lithium-transition metal sulfate compound (such as $Li_xFe_2(SO_4)_3$). These positive electrode active materials may be configured alone, or in a mixed material type of two or more kinds thereof.

The cathode electrode (electrode for a secondary battery) 13 includes a current collector 17, and a cathode active material layer 18 that is formed on one surface (first surface) of the current collector 17. The current collector 17 may appropriately employ a material that is used in the related art as a cathode electrode current collector material for a secondary battery. Examples thereof include aluminum, nickel, copper, iron, stainless steel (SUS), titanium, and the like. Copper is particularly preferable from the viewpoints of electron conductivity and battery operation potential. A typical thickness of the current collector 17 is approximately 10 μm to 30 μm.

The cathode active material layer 18 contains a cathode active material (active material), a binder, and a conductive agent. The cathode active material that is used in this embodiment is not particularly limited as long as the cathode active material is capable of reversibly lithiating and delithiating Li, and a known material can be used. As the cathode active material, it is preferable to use a material that forms an alloy with Li. Particularly, when a material having a capacity greater than that of graphite is used, an effect of the invention is significantly obtained.

As the material that forms an alloy with Li, one or more alloys selected from the group consisting of Si, Ge, Sn, Pb, Al, Ag, Zn, Hg, and Au can be used. As an alloy, $SiO_x$ is preferable, and the $SiO_x$ in which x is 1.5 or less is more preferable. When x is greater than 1.5, it is difficult to sufficiently secure lithiate and delithiate e amount of Li. In addition to the active material, graphite may be added as an active material.

In a surface of the active material, a surface polarity may be changed with a silane coupling agent. The silane coupling agent is expressed by the following Formula (1), and is constituted by an alkoxy group (X) and an organic functional group (Y). In addition to the silane coupling agent expressed by Formula (1), the material that changes the surface polarity of the active material may be siloxane in which dehydration condensation occurs between silane coupling agents. Preferably, 3-aminopropyl trimethoxy silane may be used.

$$X_3\text{---Si---Y} \tag{1}$$

Here, X represents a methoxy group, an ethoxy group, or a propyloxy group.

Y is expressed by —$(CH_2)_n$—Y', n is 0 to 10, and Y' represents —$NH(C_6H_5)$, -2-imidazolin-1-yl, —$NH_2$, —$NH(CH_2)2NH_3$, —$CH_3$, or —$C_6H_5$.

An amount of the silane coupling agent added on the basis of the weight of the active material is 0.1% by weight to 20% by weight, and preferably 0.9% by weight to 8% by weight. When the amount is less than 0.1% by weight, the effect of changing the surface polarity is not obtained. When the amount is greater than 20% by weight, interface resistance of the active material increases, and thus a capacity that is obtained decreases.

For a particle size of the active material, it is preferable that D50 (median size: a particle size in which an integrated value is 50%, and represents an average particle size) be 0.5 µm to 10 µm. In a case where D50 of the active material is greater than 10 µm, a current per total surface area of the active material increases, and thus electrode resistance increases and a capacity decreases. On the other hand, in a case where D50 is less than 0.5 µm, in a process of preparing electrode slurry, the active material is likely to aggregate, and thus it is difficult to obtain slurry in which the active material is uniformly dispersed. As a result, the electrode resistance increases, and the capacity decreases.

The binder is a polymer that is formed from a sugar chain structure that contains a carboxyl group. In addition, it is preferable that a hydroxyl group contained in the sugar chain structure be partially substituted with a carboxyl group for water solubility. A sodium alginate is more preferable. The sodium alginate is bound to a functional group on a surface of the active material by a hydrogen bond. Accordingly, cycle characteristics vary due to the surface polarity of the active material. In addition, it is preferable that the amount of the binder be 3% by weight to 20% by weight with regard to the weight of the active material. When the amount of the binder is less than 3% by weight, sufficient binding is not obtained. When the amount of the binder is greater than 20% by weight, a capacity per electrode volume greatly decreases.

As the conductive agent, carbon black, natural graphite, artificial graphite, a metal oxide such as titanium oxide and ruthenium oxide, metal fiber, and the like can be used. Among these, carbon black, which exhibits a structure construction, is preferable, and furnace black, ketjen black, or acetylene black (AB), which is a kind of carbon black, is more preferably used. A mixed system of the carbon black and other conductive agents such as vapor-grown carbon fiber is also preferably used.

Examples of an electrolytic solvent that constitutes the electrolyte layer 11 include chain carbonic acid ester having low viscosity such as dimethyl carbonate, and diethyl carbonate, cyclic carbonic acid ester having high dielectric constant such as ethylene carbonate, propylene carbonate, and butylene carbonate, γ-butyrolactone, 1,2-dimethoxyethane, tetrahydrofuran, 2-methyl tetrahydrofuran, 1,3-dioxolane, methyl acetate, methyl propionate, vinylene carbonate, dimethylformamide, sulfolane, mixed solvents thereof, and the like.

The electrolyte that is contained in the electrolytic solvent is not particularly limited, and examples thereof include $LiClO_4$, $LiBF_4$, $LiAsF_6$, $LiPF_6$, $LiCF_3SO_3$, $LiN(CF_3SO_2)_2$, LiI, $LiAlCl_4$, mixtures thereof, and the like. A lithium salt obtained by mixing one or more kinds of $LiBF_4$ and $LiPF_6$ is preferable.

EXAMPLES

Hereinafter, the invention will be described in more detail with reference to Examples, but the invention is not limited by Examples.

Example 1

The polarity of the surface of the active material was changed in the following order. 6.00 g of SiO (manufactured by OSAKA Titanium Technologies Co., Ltd.) having D50 of 6.6 µm was added to 30.00 g of 2-isopropyl alcohol. Next, 0.09 g of N-[3-(trimethoxysilyl)propyl]aniline was added to the mixture and the resultant mixture was stirred. Next, 0.60 g of water was added dropwise to the mixture and the resultant mixture was stirred for one night. Then, the resultant mixture was subjected to a filtering treatment while being washed with 2-isopropyl alcohol. A powder that was obtained was dried under reduced pressure at 80° C. for 3 hours.

4.46 g of active material that was obtained, 0.89 g of acetylene black, 0.89 g of vapor-grown carbon fiber, and 0.89 g of sodium alginate were added to 52.86 g of water, and the resultant mixed solvent was preliminary dispersed with a dispersion device and subjected to main dispersion with a Filmix, thereby obtaining cathode electrode slurry.

The cathode electrode slurry obtained was applied to a current collector. As the current collector, copper foil having a thickness of 12 µm was used.

The cathode electrode slurry was applied to the current collector with a doctor blade to be a target amount of 2.8 mg/cm$^2$. Subsequently, preliminary drying was performed at 80° C. for 30 minutes. Pressing was performed to attain a density of 1.0 g/cm$^3$, and drying under reduced pressure was performed at 105° C. for 5 hours, thereby obtaining a cathode electrode.

Example 2

The polarity of the surface of the active material was changed in the following order. 6.06 g of SiO (manufactured by OSAKA Titanium Technologies Co., Ltd.) having D50 of 6.6 pin was added to 30.04 g of 2-isopropyl alcohol. Next, 0.09 g of triethoxy-3-(2-imidazolin-1-yl) propylsilane was added to the mixture and the resultant mixture was stirred. Next, 0.61 g of water was added dropwise to the mixture and the resultant mixture was stirred for one night. Then, the resultant mixture was subjected to a filtering treatment while being washed with 2-isopropyl alcohol. The powder obtained was dried under reduced pressure at 80° C. for 3 hours. Then, cathode electrode slurry was obtained by subjecting a mixed solvent to main dispersion with a Filmix in the same manner as in Example 1. The cathode electrode slurry was applied to the current collector and pressing was performed after drying, thereby obtaining a cathode electrode.

Example 3

The polarity of the surface of the active material was changed in the following order. 6.03 g of SiO (manufactured by OSAKA Titanium Technologies Co., Ltd.) having D50 of 6.6 µm was added to 30.03 g of 2-isopropyl alcohol. Next, 0.06 g of 3-aminopropyl trimethoxy silane was added to the mixture and the resultant mixture was stirred. Next, 0.62 g of water was added dropwise to the mixture and the resultant mixture was stirred for one night. Then, the resultant mixture was subjected to a filtering treatment while being washed with 2-isopropyl alcohol. The powder obtained was dried under reduced pressure at 80° C. for 3 hours. Then, cathode electrode slurry was obtained by subjecting a mixed solvent to main dispersion with a Filmix in the same manner as in Example 1. The cathode electrode slurry was applied to the current collector and pressing was performed after drying, thereby obtaining a cathode electrode.

Example 4

The polarity of the surface of the active material was changed in the following order. 6.02 g of SiO (manufactured by OSAKA Titanium Technologies Co., Ltd.) having D50 of 6.6 μm was added to 30.45 g of 2-isopropyl alcohol. Next, 0.21 g of 3-aminopropyl trimethoxy silane was added to the mixture and the resultant mixture was stirred. Next, 0.64 g of water was added dropwise to the mixture and the resultant mixture was stirred for one night. Then, the resultant mixture was subjected to a filtering treatment while being washed with 2-isopropyl alcohol. The powder obtained was dried under reduced pressure at 80° C. for 3 hours. Then, cathode electrode slurry was obtained by subjecting a mixed solvent to main dispersion with a Filmix in the same manner as in Example 1. The cathode electrode slurry was applied to the current collector and pressing was performed after drying, thereby obtaining a cathode electrode.

Example 5

The polarity of the surface of the active material was changed in the following order. 6.05 g of SiO (manufactured by OSAKA Titanium Technologies Co., Ltd.) having D50 of 6.6 μm was added to 30.14 g of 2-isopropyl alcohol. Next, 0.40 g of 3-aminopropyl trimethoxy silane was added to the mixture and the resultant mixture was stirred. Next, 0.61 g of water was added dropwise to the mixture and the resultant mixture was stirred for one night. Then, the resultant mixture was subjected to a filtering treatment while being washed with 2-isopropyl alcohol. The powder obtained was dried under reduced pressure at 80° C. for 3 hours. Then, cathode electrode slurry was obtained by subjecting a mixed solvent to main dispersion with a Filmix in the same manner as in Example 1. The cathode electrode slurry was applied to the current collector and pressing was performed after drying, thereby obtaining a cathode electrode.

Example 6

The polarity of the surface of the active material was changed in the following order. 6.00 g of SiO (manufactured by OSAKA Titanium Technologies Co., Ltd.) having D50 of 6.6 μm was added to 30.04 g of 2-isopropyl alcohol. Next, 0.99 g of 3-aminopropyl trimethoxy silane was added to the mixture and the resultant mixture was stirred. Next, 0.62 g of water was added dropwise to the mixture and the resultant mixture was stirred for one night. Then, the resultant mixture was subjected to a filtering treatment while being washed with 2-isopropyl alcohol. The powder obtained was dried under reduced pressure at 80° C. for 3 hours. Then, cathode electrode slurry was obtained by subjecting a mixed solvent to main dispersion with a Filmix in the same manner as in Example 1. The cathode electrode slurry was applied to the current collector and pressing was performed after drying, thereby obtaining a cathode electrode.

Example 7

The polarity of the surface of the active material was changed in the following order. 6.01 g of SiO (manufactured by OSAKA Titanium Technologies Co., Ltd.) having D50 of 6.6 μm was added to 31.27 g of 2-isopropyl alcohol. Next, 2.02 g of 3-aminopropyl trimethoxy silane was added to the mixture and the resultant mixture was stirred. Next, 0.64 g of water was added dropwise to the mixture and the resultant mixture was stirred for one night. Then, the resultant mixture was subjected to a filtering treatment while being washed with 2-isopropyl alcohol. The powder obtained was dried under reduced pressure at 80° C. for 3 hours. Then, cathode electrode slurry was obtained by subjecting a mixed solvent to main dispersion with a Filmix in the same manner as in Example 1. The cathode electrode slurry was applied to the current collector and pressing was performed after drying, thereby obtaining a cathode electrode.

Comparative Example 1

A cathode electrode was prepared in the following order without changing the polarity of the surface of the active material. 4.50 g of SiO (manufactured by OSAKA Titanium Technologies Co., Ltd.) having D50 of 6.6 μm, 0.89 g of acetylene black, 0.87 g of vapor-grown carbon fiber, and 0.89 g of sodium alginate were added to 52.94 g of water, and the resultant mixed solvent was subjected pre-dispersion with a dispersion device. Then, the mixed solvent was subjected to main dispersion with a Filmix, thereby obtaining cathode electrode slurry.

The cathode electrode slurry was applied to a current collector. As the current collector, copper foil having a thickness of 12 μm was used.

The cathode electrode slurry was applied to the current collector with a doctor blade to be a target amount of 2.8 mg/cm$^2$. Subsequently, preliminary drying was performed at 80° C. for 30 minutes. Pressing was performed to attain a density of 1.0 g/cm$^3$, and drying under reduced pressure was performed at 105° C. for 5 hours, thereby obtaining a cathode electrode.

Preparation of Cell, and Evaluation

A coin cell including the obtained cathode electrode and Li foil as a counter electrode was prepared, and charge and discharge evaluation was performed. The coin cell had the following configuration. With regard to the cathode electrode, a disk having a diameter of 15 mm was punched, and with regard to the Li foil, a disk having a diameter of 16 mm was punched, and then evaluation was performed. The thickness of the Li foil was set to 300 μm. As a basic configuration, the coin cell included the Li foil, the cathode electrode, and a separator (identification number 2200, manufactured by Celgard LLC.). An electrolytic solvent, which was obtained by adding $LiPF_6$ in a mixed solvent of ethylene carbonate (EC) and diethylene carbonate (DMC) (a mixing ratio was set to 3:7 (v/v)) to be 1 M, was used. 113 cycles of charge and discharge were performed at 0.01 V to 1.5 V. At a first cycle, 0.05 C CC charge and 0.05 C CC discharge were performed. At a second cycle, 0.1 C CC charge and 0.1 C CC discharge were performed. At a third cycle, 0.2 C CC charge and 0.2 C CC discharge were performed. At a fourth cycle and the subsequent cycles, 0.2 C CC charge and 1.0 C CC discharge were performed.

Figure 2:
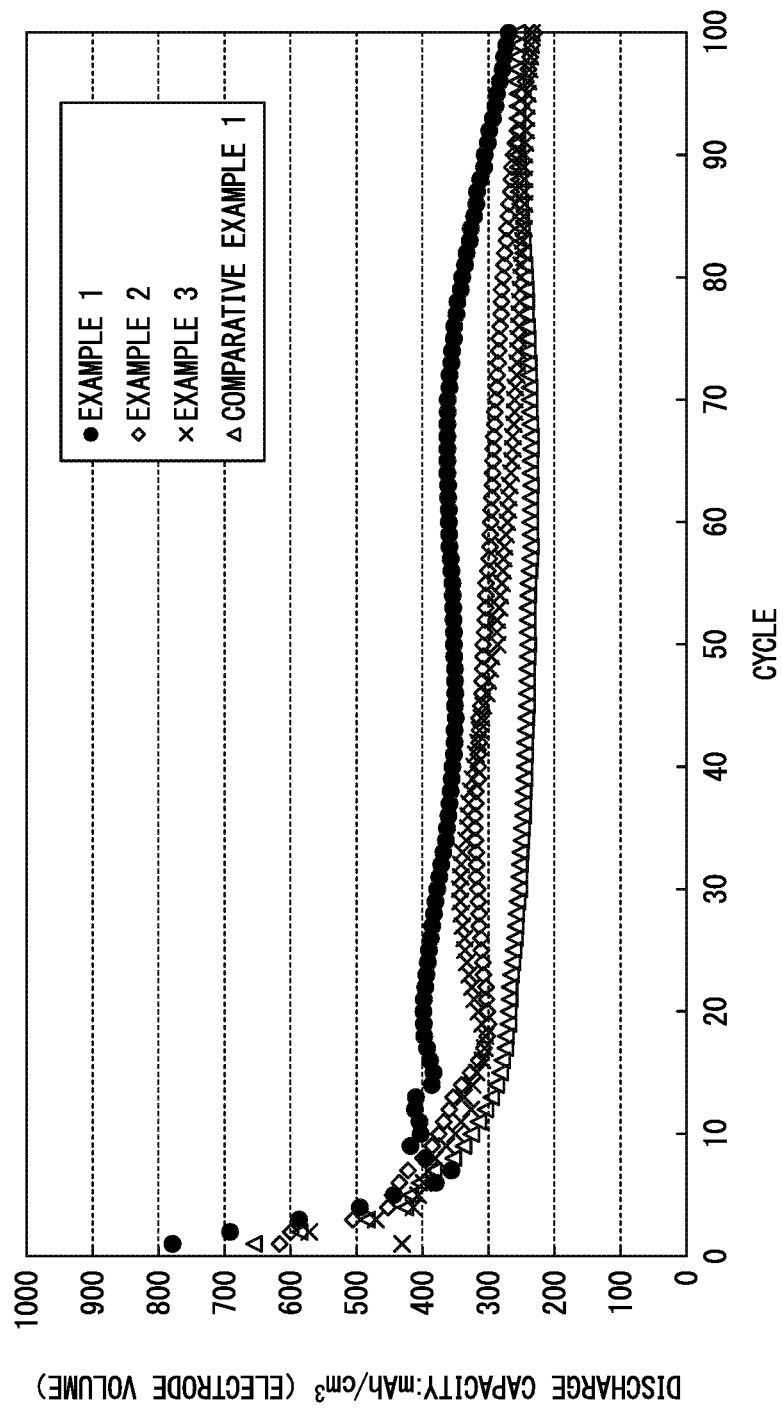
FIG. 2 is a graph illustrating a verification result of the invention.

A graph of a relationship between the discharge capacity and the cycles in Examples 1 to 3, and Comparative Example 1 is illustrated in FIG. 2 as a Verification Example 1.

From a verification result illustrated in FIG. 2, it can be seen that cycle characteristics of Examples 1 to 3 were more satisfactory in comparison to Comparative Example 1. Particularly, it was confirmed that it was possible to suppress a decrease in a capacity at an initial period of the cycles, and thus changing of the polarity on the surface of the active material according to the invention was more effective in comparison to the sodium alginate binder.

Figure 3:
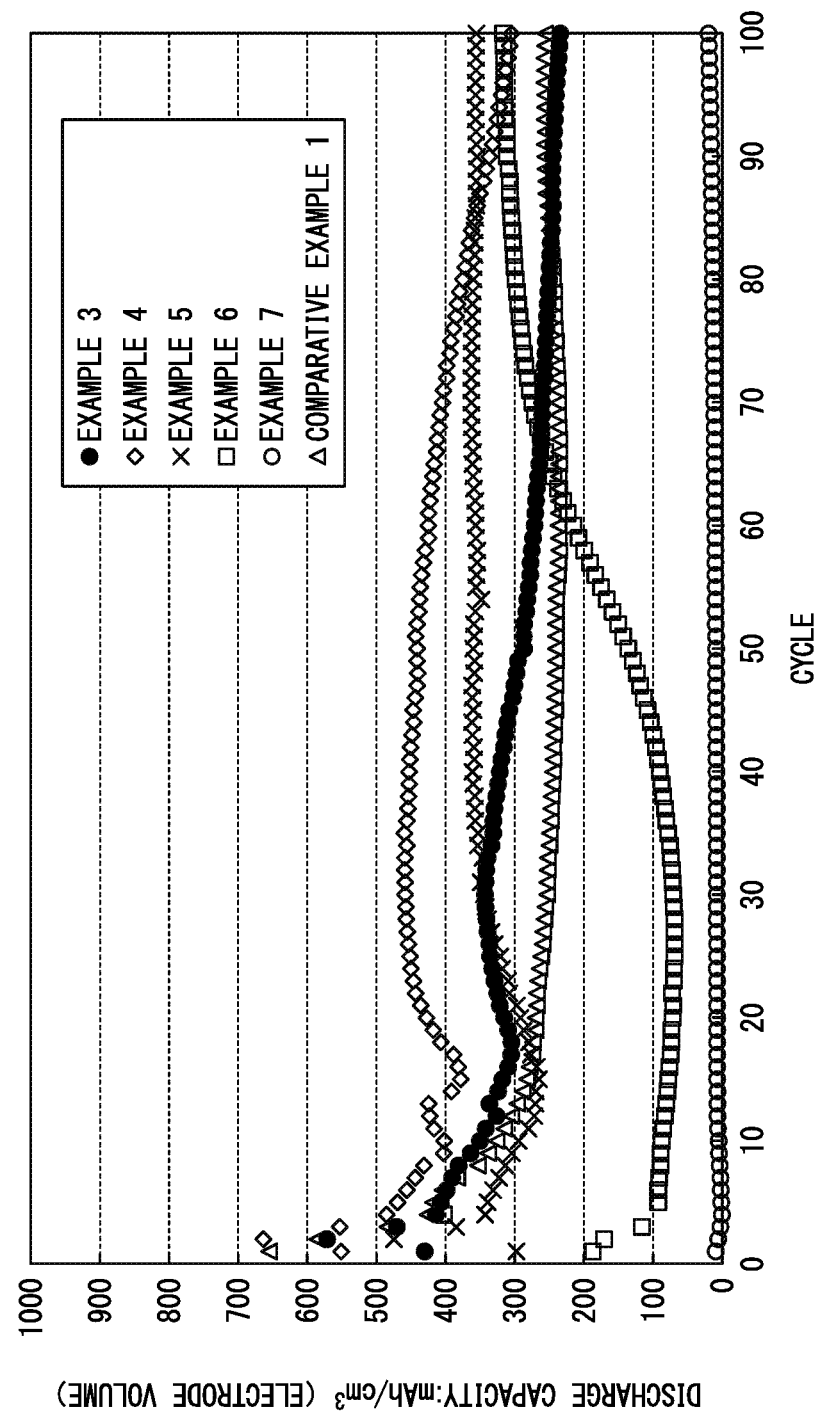
FIG. 3 is a graph illustrating a verification result of the invention.

Next, a graph of a relationship between the discharge capacity and the cycles of Examples 3 to 7 and Comparative Example 1 is illustrated in FIG. 3 as Verification Example 2.

As a result of considering the amount of the silane coupling agent which was introduced, from a verification result illustrated in FIG. 3, it was confirmed that in Examples 4 and 5, the capacity has increased from 20 cycles to 100 cycles in comparison to Comparative Example 1. In addition, in Example 5, the capacity after 30 cycles stably transitioned. From these results, it was confirmed that the invention contributes to stabilization of cycle characteristics.

The electrode for a secondary battery obtained according to the invention can be used as an electrode of a power supply of various portable electronic apparatuses, a storage battery for drive of an electric vehicle in which a high energy density is demanded, a storage device of various kinds of energy such as solar energy and wind power generation, a power storage source of a household electric apparatus, and the like.

What is claimed is:

1. An electrode for a second battery, comprising:
a current collector; and
an active material layer formed on a surface of the current collector, and containing an active material and a binder, wherein
the active material contains $SiO_x$, "x" being 1.5 or less,
a surface of the $SiO_x$ of the active material is modified with at least one of an aniline group or an imidazole group,
the binder is an alginate constituted by a water-soluble polymer having a sugar chain structure that contains a carboxyl group, and
the carboxyl group of the alginate is bound to a group among the at least one of the aniline group or the imidazole group on the surface of the $SiO_x$ of the active material by a hydrogen bond.

2. The electrode for a secondary battery according to claim 1, wherein
a median particle size of the $SiO_x$ is 0.5 µm to 10 µm.

3. The electrode for a secondary battery according to claim 1, wherein
a weight ratio of the binder in the active material layer is 3% by weight to 20% by weight with regard to a weight of the active material.

4. A secondary battery, comprising:
the electrode for a secondary battery according to claim 1.

* * * * *